Patented Mar. 3, 1953

2,630,429

UNITED STATES PATENT OFFICE 2,630,429

PREPARATION OF WEAKLY BASIC ANION-EXCHANGE RESINS

Jesse C. H. Hwa, Philadelphia, Pa., assignor to Rohm & Haas Company, Philadelphia, Pa., a corporation of Delaware No Drawing. Application October 5, 1951, Serial No. 250,039

12 Claims. (Cl. 260—86.7)

1

This invention relates to anion-exchange resins and to their preparation. It relates to insoluble, anion-exchange resins which are weakly basic. It also relates to the process by which these weakly basic anion-exchange resins are prepared.

The products of this invention are made by reacting ammonia or a primary or a secondary amine with an insoluble, cross-linked polymer of a glycidyl ester of acrylic acid or of an alpha-substituted acrylic acid such as alpha-methylacrylic acid. Reaction takes place between the oxirane oxygen atom of the glycidyl ester and the nitrogen atom of the ammonia compound.

The process can be better understood from a consideration of a preferred embodiment of this invention; namely, the preparation of an anion-exchange resin by the reaction of dimethylamine and a cross-linked polymer of glycidyl methacrylate:

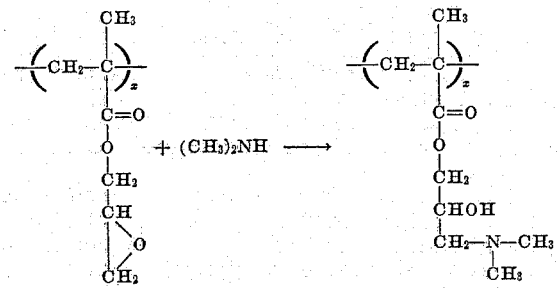

The character $x$ is employed in the conventional way to indicate that the structural unit shown is only one of many such units joined together in the polymeric glycidyl ester.

The scope of the invention is indicated by the following representation:

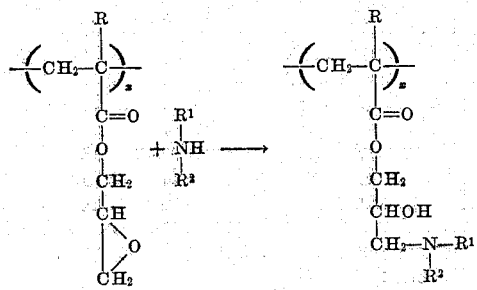

In the above, R represents an atom of hydrogen or an atom of chlorine or an alkyl group of one to four carbon atoms; and $NHR^1R^2$ represents ammonia or a primary or a secondary amine in which $R^1$ and $R^2$ stand for a hydrogen atom or

2 an organic radical. Those amines are preferred in which the organic radicals represented by $R^1$ and $R^2$ are unsubstituted hydrocarbon groups or are hydrocarbon radicals containing amino groups as substituents as in the case of the polyalkylene-polyamines, typified by diethylene-triamine.

It is to be noted that the oxirane rings of the polymeric glycidyl ester open during the reaction but that the rest of the macromolecule, including the group R, remains inert and intact. Furthermore, the organic groups attached to the amino nitrogen atoms are not altered; and all that is required of the amine is that it contain at least one reactive amino hydrogen atom, as in a primary amino group, —NH₂, or a secondary amino group, =NH. Amino groups then become attached to the insoluble macromolecules and, as a consequence, the product acquires the properties of a weakly basic anion-exchange resin.

The monomeric glycidyl esters which are polymerized, cross-linked, and then reacted with a primary or a secondary amine to produce the anion-exchange resins of this invention include the glycidyl esters of acrylic acid, alpha-chloroacrylic acid, alpha-methylacrylic acid, alpha-ethylacrylic acid, the isomeric alpha-propyl-acrylic acids, and the isomeric alpha-butylacrylic acids. These monomeric esters are known and are ordinarily prepared by reacting a salt of the acid with epichlorohydrin, for example according to the method of U. S. Patent No. 2,537,981 of January 16, 1951.

The glycidyl esters are polymerized together with a cross-linking agent so as to produce insoluble polymeric products. Cross-linking agents are well known and embrace those compounds which are copolymerizable with the glycidyl esters and which contain a plurality of non-conjugated vinylidene groups, $CH_2=C<$. Currently, divinylbenzene is the most common cross-linking agent but others which are operable include diallyl esters of polycarboxylic acids, e. g., diallyl phthalate, diallyl succinate, and diallyl maleate; vinyl esters of polycarboxylic acids, e. g., divinyl sebacate; and polyvinyl hydrocarbons such as divinylnaphthalene, trivinylbenzene, trivinylnaphthalene, and polyvinylanthracenes.

By varying the amount of the cross-linking agent used in the preparation of the copolymer, variations can be made in the physical properties of the polymeric material which carry through to the finished product. Thus, for example, higher amounts of cross-linker make for products of higher density. In general the amount of copolymerizable cross-linking agent can vary from 0.1% to 40% of the total polymerizable materials on a molar basis. In practice, however, it is preferred to use at least 0.5%; and for most purposes no benefit is derived from using over about 10%.

The polymeric base material can be formed by any of the known polymerization processes such as polymerization in mass, in solvents for the monomeric materials or in emulsion or suspension in a liquid which is not a solvent for the monomers. The last is the preferred method because it produces the polymer in the form of small spheroids or beads, the size of which can be regulated and controlled.

The polymerization of the glycidyl ester and the copolymerizable cross-linking agent is accelerated by means of well known catalysts. These catalysts include ozone; ozonides; organic peroxidic compounds such as acetyl peroxide, lauroyl peroxide, stearoyl peroxide, tert.-butyl hydroperoxide, benzoyl peroxide, tert.-butyl-perbenzoate, di-tert.-butyl diperphthalate, di-tert.-butyl peroxide, and the barium salt of tert.-butyl hydroperoxide; inorganic agents such as barium peroxide, sodium peroxide, hydrogen peroxide; and the so-called "per salts" such as the water-soluble perborates, persulfates, and perchlorates. The catalysts are employed in suitable amounts ranging from 0.1% to about 2.0% based on the weight of the monomeric material to be polymerized.

The amines which are employed are preferably used in the form of the free base. The prime requirement is that they contain at least one amino-nitrogen atom to which is attached one or two reactive hydrogen atoms. The amines which are preferred are those in which the amino group or groups are attached to hydrocarbon groups. Other amines may be used, however, including those wherein the hydrocarbon group of the amine carries a substituent group. Such amines are exemplified by ethanolamine and diethanolamine. Primary and secondary amines are operable, as well as mixtures of the two types, and also polyamines including those having both primary and secondary amino groups such as the polyalkylene-polyamines. Tertiary amines also react with the polymeric glycidyl esters but give rise to anion-exchange resins of quite different characteristics which are the subject of another application for Letters Patent, Serial No. 250,037, filed October 5, 1951. The substituents on the amino-nitrogen atoms can be aliphatic, aromatic, cycloaliphatic, araliphatic, and alkaromatic. The following typify those amines which are all suitable in this invention when used individually or in mixtures with one another: Methylamine, dimethylamine, n-butylamine, iso-butylamines, the isomeric dibutylamines, aniline, benzidine, o-, m-, and p-toluidines, xylidines, alpha- and beta-naphthylamines, benzylamine, dibenzylamine, phenylenediamine, benzylaniline, benzylethylamine, methylaniline, cyclohexylamine, dicyclohexylamine, diethylenetriamine, triethylenetetramine, tetraethylenepentamine, and propylenediamine.

The reaction of the amine and the polymeric glycidyl ester is best carried out by suspending by agitation particles of the insoluble resin in a liquid which is a solvent for the amine, such as water or an alcohol, dioxane, toluene or the like, and then agitating the reaction mixture while it is maintained at a temperature from about 0° C. to the refluxing temperature. Since, however, the process is decidedly less efficient at the lower temperatures, it is much preferred to employ a temperature from about 50° C. to the boiling point of the reaction mixtures.

While a catalyst is not necessary, it is nevertheless suggested that one be employed. Catalysts which are recommended include strong mineral acids such as hydrochloric and sulfuric acid, tertiary amine salts such as trimethylamine hydrochloride, and quaternary ammonium salts such as benzyltrimethylammonium chloride.

When the reaction is complete, the resinous product containing primary, secondary or tertiary amino groups is separated from the reaction mixture by decantation or filtration for example and is washed free of contaminants.

The following example, in which all parts are by weight, serves to illustrate the process of this invention which in its broader aspects is a method of converting insoluble, cross-linked polymers of glycidyl esters of acrylic and alpha-substituted acrylic acids into anion-exchange resins containing, as polar, anion-adsorbing groups, primary, secondary or tertiary amino groups.

Example

Into a container equipped with thermometer, mechanical stirrer, and reflux condenser were poured 1950 parts of water containing 0.5% of a commercial dispersing agent. To this stirred solution was added a mixture of 620 parts of monomeric glycidyl methacrylate, 20 parts of divinylbenzene, 20 parts of ethylstyrene, and 6.5 parts of benzoyl peroxide. The mixture was stirred for ten minutes at room temperature after which it was heated to 90° C. and held there for 1.5 hours. The mixture was then filtered; the hardened, insoluble beads of polymeric glycidyl methacrylate were washed thoroughly with water and then dried overnight in an oven at 65° C. The beads were uniform, individual and hard and had an average estimated size of 0.2 mm. diameter. The described process is particularly good for the preparation of insoluble, cross-linked polymers of all of the glycidyl esters described above.

Into a container equipped with thermometer, mechanical stirrer, and a reflux condenser were introduced successively 73 parts of the dried, cross-linked, polymeric, glycidyl methacrylate prepared above, 100 parts of water, 45 parts of diethylenetriamine and 5 parts of concentrated hydrochloric acid. The mixture was stirred and was heated to boiling over a period of one-half hour after which it was stirred and refluxed for five hours. After cooling, the mixture was filtered and the resin was washed free of amine with water. The product was still in the form of individual beads and was capable of adsorbing acids from aqueous solutions. It contained 4.5% nitrogen by analysis and had an anion-exchange capacity of 3.3 milliequivalents per gram.

Other anion-exchange resins were made in the same way by merely substituting ammonia or the other primary and secondary amines described above for the diethylenetriamine. All of the products were of the weakly basic type.

I claim:

1. A process of preparing weakly basic anion-exchange resins containing polar amino groups which comprises reacting an amino compound from the class consisting of methylamine, dimethylamine, monobutylamines, dibutylamines, aniline, benzidine, o-, m-, and p-toluidines, xylidines, alpha-naphthylamine, beta-naphthylamine, benzylamine, dibenzylamine, phenylenediamine, benzylaniline, benzylethylamine, methylaniline, cyclohexylamine, dicyclohexylamine, diethylenetriamine, triethylenetetramine, tetraethylenepentamine, propylenediamine, ethanolamine, and diethanolamine with an insoluble, cross-linked, resinous product which is a copolymer of a mixture containing (a) 90%–99.5% of a glycidyl ester having the general formula

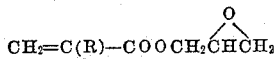

in which R represents a member of the class consisting of a hydrogen atom, a chlorine atom, and an alkyl group containing one to four carbon atoms, and (b) 0.5–10% of a compound which is copolymerizable with said ester and which contains two or three non-conjugated vinylidene groups, $CH_2=C<$.

2. A process for preparing weakly basic anion-exchange resins containing polar amino groups which comprises reacting methylamine with an insoluble, cross-linked, resinous product which is a copolymer of a mixture containing 90%–99.5% of glycidyl methacrylate and 0.5%–10% of divinylbenzene, at a temperature from 50° C. to the refluxing temperature of the reaction mixture.

3. A process for preparing weakly basic anion-exchange resins containing polar amino groups which comprises reacting dimethylamine with an insoluble, cross-linked, resinous product which is a copolymer of a mixture containing 90%–99.5% of glycidyl methacrylate and 0.5%–10% of divinylbenzene, at a temperature from 50° C. to the refluxing temperature of the reaction mixture.

4. A process for preparing weakly basic anion-exchange resins containing polar amino groups which comprises reacting diethylenetriamine with an insoluble, cross-linked, resinous product which is a copolymer of a mixture containing 90%–99.5% of glycidyl methacrylate and 0.5%–10% of divinylbenzene, at a temperature from 50° C. to the refluxing temperature of the reaction mixture.

5. A process for preparing weakly basic anion-exchange resins containing polar amino groups which comprises reacting diethylenetriamine with an insoluble, cross-linked, resinous product which is a copolymer of a mixture containing 90%–99.5% of glycidyl acrylate and 0.5%–10% of divinylbenzene, at a temperature from 50° C. to the refluxing temperature of the reaction mixture.

6. A process for preparing weakly basic anion-exchange resins containing polar amino groups which comprises reacting dimethylamine with an insoluble, cross-linked, resinous product which is a copolymer of a mixture containing 90%–99.5% of glycidyl acrylate and 0.5%–10% of divinylbenzene, at a temperature from 50° C. to the refluxing temperature of the reaction mixture.

7. A weakly basic anion-exchange resin containing polar amino groups as prepared by the process of claim 1.

8. A weakly basic anion-exchange resin containing polar amino groups as prepared by the process of claim 2.

9. A weakly basic anion-exchange resin containing polar amino groups as prepared by the process of claim 3.

10. A weakly basic anion-exchange resin containing polar amino groups as prepared by the process of claim 4.

11. A weakly basic anion-exchange resin containing polar amino groups as prepared by the process of claim 5.

12. A weakly basic anion-exchange resin containing polar amino groups as prepared by the process of claim 6.

JESSE C. H. HWA.

REFERENCES CITED

The following references are of record in the file of this patent:

UNITED STATES PATENTS

| Number | Name | Date |
|---|---|---|
| 2,580,901 | Erickson | Jan. 1, 1952 |
| 2,606,810 | Erickson | Aug. 12, 1952 |